US008279330B2

(12) United States Patent
Takaki

(10) Patent No.: US 8,279,330 B2
(45) Date of Patent: Oct. 2, 2012

(54) IMAGE PICKUP APPARATUS WITH MAIN UNIT POWER SUPPLY MONITORING AND ACCESSORY UNIT COMMUNICATION AND CONTROL METHOD THEREFOR

(75) Inventor: Yasuhito Takaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 12/534,593

(22) Filed: Aug. 3, 2009

(65) Prior Publication Data
US 2010/0066898 A1    Mar. 18, 2010

(30) Foreign Application Priority Data
Sep. 12, 2008  (JP) .................................. 2008-234857

(51) Int. Cl.
*H04N 5/225* (2006.01)
(52) U.S. Cl. ..................................... 348/372; 455/343.1
(58) Field of Classification Search .................. 348/372; 710/15, 18, 19; 340/7.32–7.37, 333, 425.2, 340/693.1–693.3; 455/343.1–343.5; 382/107; 725/25
See application file for complete search history.

(56) References Cited

U.S. PATENT DOCUMENTS

| 6,753,921 | B1* | 6/2004 | Shimizu ......................... 348/372 |
| 6,873,367 | B1* | 3/2005 | Hirata et al. .................... 348/372 |
| 7,084,921 | B1* | 8/2006 | Ogawa ........................... 348/372 |
| 7,577,767 | B1* | 8/2009 | Robillard et al. ............... 710/15 |
| 7,755,699 | B2* | 7/2010 | Morimoto ...................... 348/373 |
| 2003/0058352 | A1* | 3/2003 | Nishijima et al. .......... 348/231.1 |
| 2005/0013604 | A1* | 1/2005 | Ogawa ........................... 396/279 |
| 2008/0007647 | A1* | 1/2008 | Masuda ......................... 348/372 |

FOREIGN PATENT DOCUMENTS
JP          07-143749          6/1995
* cited by examiner

*Primary Examiner* — Tuan Ho
(74) *Attorney, Agent, or Firm* — Cowan, Liebowitz & Latman, P.C.

(57) ABSTRACT

An image pickup apparatus able to reliably detect a power supply abnormality even in an arrangement in which power supplies are managed by using a communication unit of single system. The image pickup apparatus includes a recording unit for writing image data onto a recording medium, and a power supply control unit for selecting and executing either a monitoring operation to monitor a state of a power supply for a camera main unit or a communication operation to communicate with a power supply for an accessory unit. The power supply control unit selects and executes the monitoring operation while the recording unit is performing an image data writing operation.

7 Claims, 3 Drawing Sheets

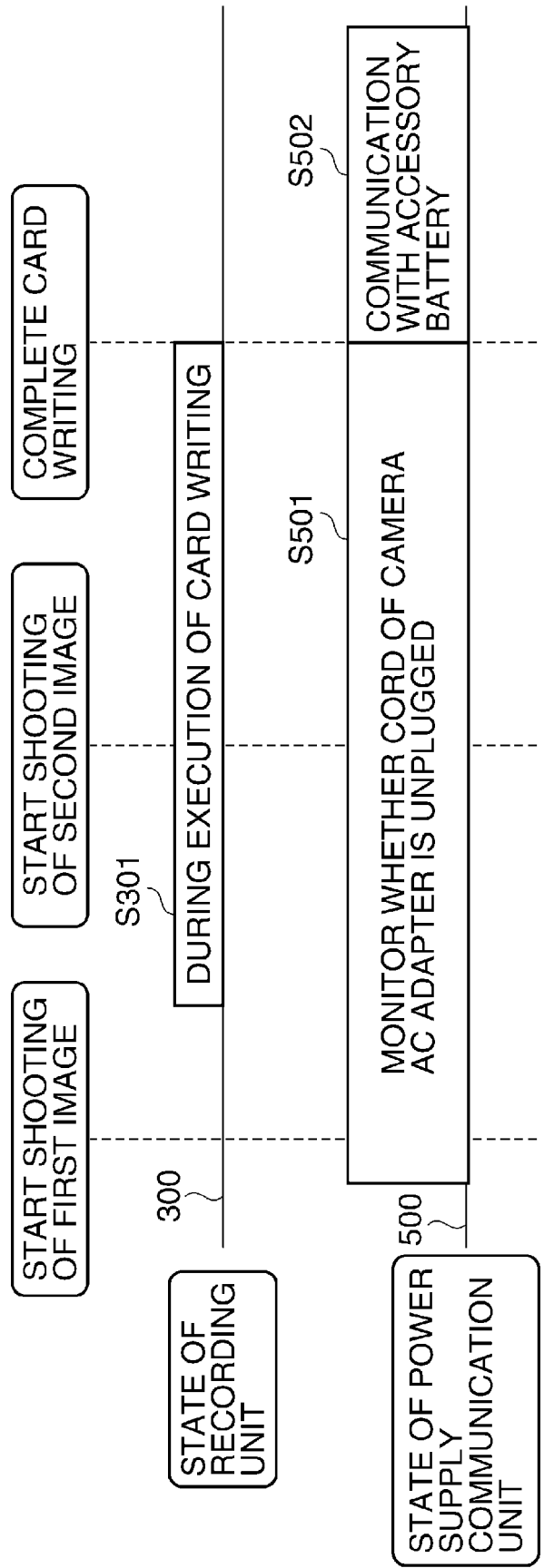

IMAGE PICKUP APPARATUS WITH MAIN UNIT POWER SUPPLY MONITORING AND ACCESSORY UNIT COMMUNICATION AND CONTROL METHOD THEREFOR

BACKGROUND OF THE INVENTION

1. Field of the Invention

The present invention relates to an image pickup apparatus for picking up (imaging), recording, and reproducing a still image or a moving image, and relates to a control method for the image pickup apparatus.

2. Description of the Related Art

Some battery pack for a digital camera as an image pickup apparatus has a communication function. Such a battery (communication battery) is able to calculate remaining capacity information or other information based on battery voltage information, battery discharge current information, etc., and transmit the calculated information to a camera main unit via a communication line.

Aside from battery, an AC adapter can be mounted to a digital camera for use as a power source. The AC adapter converts external AC power supplied thereto via an AC power cord into DC power, and supplies the DC power to the camera. Since the AC adapter is soon unable to supply the DC power when the AC power cord is unplugged, it is preferable to notify in some way the digital camera of the unplugging of the AC power cord.

Some prior art AC adapter is configured to combine its DC output voltage with a signal voltage that varies according to DC voltage specification information, thereby notifying the DC voltage specification information to an electronic equipment supplied with the DC output voltage of the AC adapter (see, Japanese Laid-open Patent Publication No. 7-143749).

A digital camera using the above-described communication battery has a battery housing unit provided with a communication line terminal. Therefore, it may be possible to dispose an AC adapter in the battery housing unit and detect a change in DC output voltage of the AC adapter by utilizing, e.g., the technique disclosed in Japanese Laid-open Patent Publication No. 7-143749. With this conceivable arrangement, the digital camera mounted with the AC adapter is able to determine that the AC power cord is unplugged when it detects a reduction in the DC output voltage of the AC adapter (cord unplugging notification) via the communication line.

In a digital camera using two or more power supplies, however, AC power cord unplugging cannot be determined by the above-described conceivable arrangement in some cases.

It is assumed for example that a digital camera has a camera main unit and an accessory attached thereto, different power supplies are used for the camera main unit and the accessory, the accessory does not have communication means to communicate with its power source, and the camera main unit has its communication means of single system. In that case, the camera main unit manages both the power supplies, while switching the communication destination of the communication means between the power supplies for the camera main unit and the accessory. In other words, it is impossible for the camera main unit to simultaneously monitor the power supply for the camera main unit (e.g., AC adapter) and the power supply for the accessory (e.g., communication battery).

With the above arrangement, if the AC power cord of the AC adapter is unplugged when the camera main unit is communicating with the communication battery for the accessory, the camera main unit cannot detect the unplugging of the AC power cord. If some data is being written into a memory card at the instant that the power cord is unplugged, there is a fear that data in the memory card is damaged and so on.

As described above, with the technique disclosed in Japanese Laid-open Patent Publication No. 7-143749, it is possible to notify a digital camera of occurrence of abnormality in power supply. Even if such a technique is applied to a digital camera in which a plurality of power supplies are managed by using communication means of single system, however, an occurrence of power supply abnormality cannot be detected depending on the timing of occurrence of abnormality.

SUMMARY OF THE INVENTION

The present invention provides an image pickup apparatus and a control method therefor, which are capable of reliably detecting a power supply abnormality even in an arrangement in which a plurality of power supplies are managed by using communication means of single system.

According to a first aspect of this invention, there is provided an image pickup apparatus having an image pickup apparatus main unit and an accessory unit mounted to the image pickup apparatus main unit, comprising a write control unit adapted to write image data onto a recording medium, and an operation control unit adapted to select and execute either a monitoring operation to monitor a state of a power supply for the image pickup apparatus main unit or a communication operation to communicate with a power supply for the accessory unit, wherein the operation control unit is adapted to select and execute the monitoring operation while the write control unit is performing an image data writing operation.

According to a second aspect of this invention, there is provided a control method for an image pickup apparatus having an image pickup apparatus main unit and an accessory unit mounted to the image pickup apparatus main unit, comprising a write control step of writing image data onto a recording medium by a write control unit, and an operation control step of selecting and executing either a monitoring operation to monitor a state of a power supply for the image pickup apparatus main unit or a communication operation to communicate with a power supply for the accessory unit, wherein in the operation control step, the monitoring operation is selected and executed while the write control unit is performing an image data writing operation.

With the present invention, it is possible to reliably detect a power supply abnormality even in an arrangement that manages a plurality of power supplies by using communication means of single system.

Further features of the present invention will become apparent from the following description of an exemplary embodiment with reference to the attached drawings.

BRIEF DESCRIPTION OF THE DRAWINGS

FIG. 3 is a view showing changes in states of the recording unit and the power supply communication unit with elapse of time during when two images are continuously shot in a case where an AC adapter is housed in the camera power supply housing unit and a communication battery is housed in the accessory power supply housing unit.

DETAILED DESCRIPTION OF THE PREFERRED EMBODIMENT

The present invention will now be described in detail below with reference to the drawings showing a preferred embodiment thereof.

Figure 1:
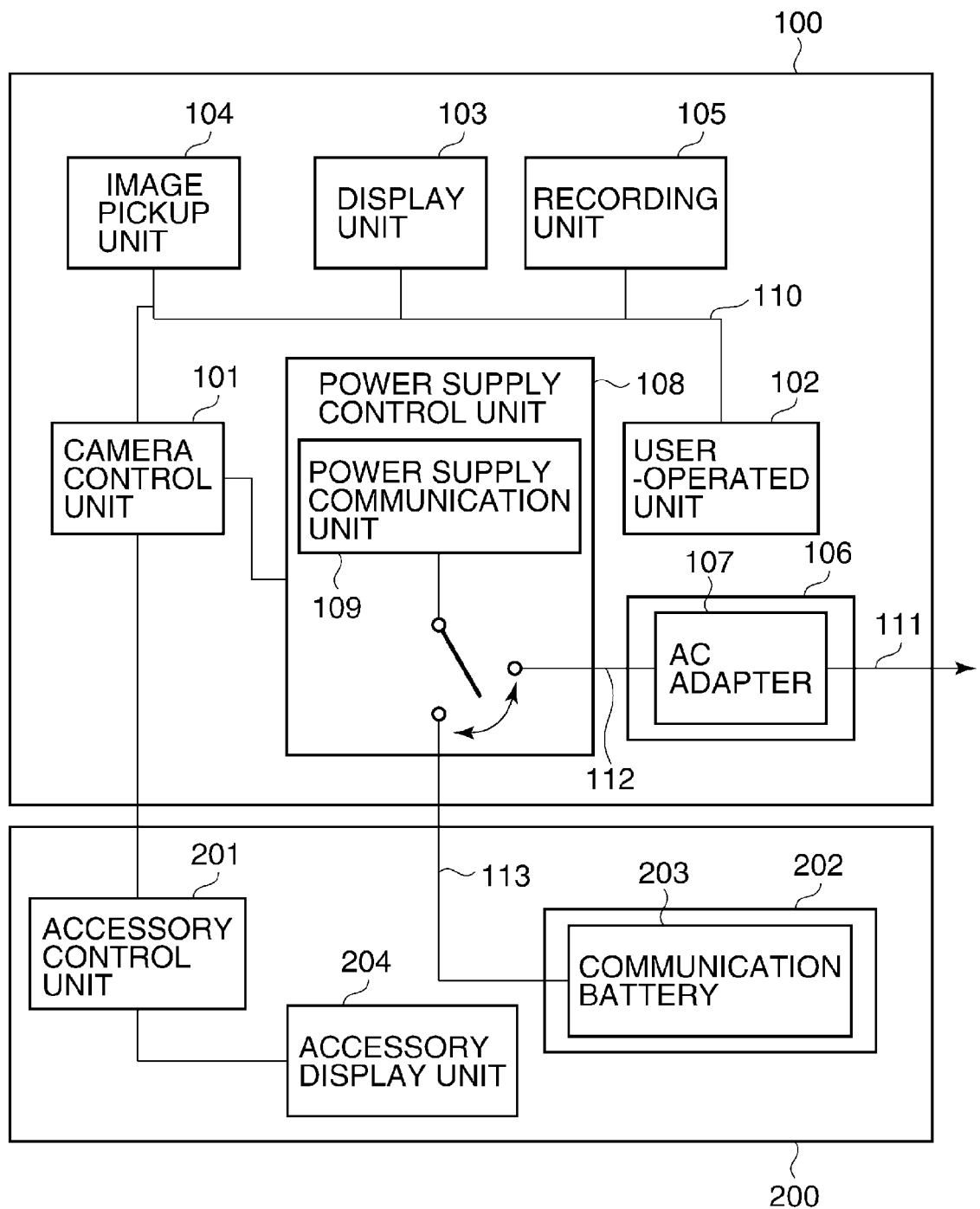
FIG. 1 is a functional block diagram showing a digital camera as an image pickup apparatus according to one embodiment of this invention.

FIG. 1 shows in function block diagram a digital camera as an image pickup apparatus according to one embodiment of this invention.

As shown in FIG. 1, the digital camera (camera system) includes a camera main unit (image pickup apparatus main unit) 100 and an accessory unit 200 adapted, e.g., to be detachably mounted on the camera main unit 100.

The construction and function of the camera main unit 100 are first described.

The camera main unit 100 includes an AC adapter (power supply unit) 107 adapted to be detachably housed in a camera power supply housing unit 106 and convert external AC power supplied from an external AC power supply into DC power. The AC adapter 107 includes, for example, an input part which has a connector adapted to be detachably coupled with a plug provided at one end of an AC power cord 111 whose another end is connected with the AC power supply and which inputs the external AC power via an AC power cord 111, and a transformer/rectifier circuit for converting the external AC power into DC power and outputting the DC power. The DC power output from the AC adapter 107 is supplied via a circuit (not shown) to respective parts of the camera main unit 100. It should be noted that it is not inevitably necessary for the input part of the AC adapter 107 to have a connector for connection with the AC power cord 111. Instead, the input part may directly be connected with one end of the AC power cord 111.

At activation of the camera main unit 100, the AC adapter 107 having a communication function notifies a power supply control unit 108 by serial communication via a communication line 112 that the AC adapter 107 is housed in the camera power supply housing unit 106. When the AC power cord 111 is unplugged, the AC adapter 107 causes the communication line 112 at a low level for a predetermined time period to thereby notify the power supply control unit 108 that the AC cord 111 is unplugged. It should be noted that, instead, the camera power supply housing unit 106 may have such a communication function.

The power supply control unit 108 controls a power supply communication unit 109 so as to selectively communicate with either the power supply in the camera power supply housing unit 106 or a power supply in an accessory power supply housing unit 202 for acquisition of power supply information. Then, the power supply control unit 108 notifies the acquired power supply information to a camera control unit 101.

When detecting that the communication line 112 is at a low level for a predetermined time period in a condition that the AC adapter 107 is housed in the camera power supply housing unit 106, the power supply control unit 108 determines that the AC power cord 111 is unplugged, and notifies the camera control unit 101 of the unplugging of the AC power cord.

The camera control unit 101 acquires the power supply information from the power supply control unit 108. When acquiring information on the power supply housed in the accessory power supply housing unit 202, the camera control unit 101 notifies the information to an accessory control unit 201.

When acquiring information on the power supply housed in the camera power supply housing unit 106, the camera control unit 101 performs processing according to the content of the acquired information. Specifically, when receiving a notification of the unplugging of the AC power cord, the camera control unit 101 requests a recording unit 105 to discontinue a writing operation, if the recording unit 105 is performing the operation of writing an image file.

The camera control unit 101 receives from a user-operated unit 102 information representing a user operation performed on the unit 102, and controls image pickup process, image information writing/reading process, or the like in accordance with the received information. When, for example, receiving a release start notification from the user-operated unit 102, the camera control unit 101 carries out the image pickup process.

The camera control unit 101 is adapted to be connected with the accessory power supply housing unit 202 when the accessory unit 200 is mounted to the camera main unit 100, to thereby detect that the accessory unit 200 is mounted to the main unit 100.

The recording unit 105 creates an image file in which shooting parameters, etc. are combined with image data obtained by an image pickup unit 104, and writes the image file onto a recording medium such as a memory card or a flash memory. When requested by the camera control unit 101 to discontinue image file writing during execution thereof, the recording unit 105 discontinues the image file writing and carries out a process for closing the recording medium to thereby protect the recording medium.

The user-operated unit 102 accepts a user's operation thereon such as depressing a button of the unit 102, and requests the camera control unit 101 to carry out control corresponding to the user's operation.

A display unit 103 is able to display various information to the user according to a request from the camera control unit 101.

The image pickup unit 104 converts an optical image into digital information under the control of the camera control unit 101, and delivers the resultant image data or video data to the recording unit 105.

An internal bus 110 to which the units 101 to 105 are connected serves as a transmission path for various information.

The camera power supply housing unit 106 is configured to house a power supply such as the AC adapter 107 or a communication battery similar to a communication battery 203. The power supply housed in the housing unit 106 is connected via the communication line 112 with the power supply communication unit 109. The communication unit 109 is adapted to communicate with the power supply in the housing unit 106 via the communication line 112.

Next, the construction and function of the accessory unit 200 adapted to be mounted to the camera main unit 100 are described.

When the accessory unit 200 is mounted to the main unit 100, the accessory control unit 201 notifies the camera control unit 101 that the accessory unit 200 is mounted to the main unit 100.

When acquiring from the camera control unit 101 information on the power supply housed in the accessory power supply housing unit 202, the accessory control unit 201 requests an accessory display unit 204 to display the acquired information, e.g., remaining power supply amount.

In accordance with the request from the accessory control unit 201, the accessory display unit 204 displays the remaining power supply amount or other information.

As with the camera power supply housing unit 106, the accessory power supply housing unit 202 is able to house a power supply such as a communication battery 203 or an AC adapter similar to the AC adapter 107. The power supply housed in the housing unit 202 is connected via a communication line 113 with the power supply communication unit 109.

The communication battery 203 is adapted to supply DC power to various parts of the accessory unit 200. In accordance with a request from the power supply control unit 108, the communication battery 203 calculates remaining power amount of the battery 203 and notifies the calculated amount to the power supply control unit 108. Instead, the accessory power supply housing unit 202 may have such a communication function.

The recording unit 105 functions as a write control unit for writing image data onto a recording medium.

The power supply control unit 108 functions as an operation control unit for selectively executing either a monitoring operation to monitor a state of the power supply for the camera main unit 100 or a communication operation to communicate with the power supply (e.g., the communication battery 203) for the accessory unit 200.

The operation control unit selects and executes the monitoring operation while the write control unit is performing image data writing. After completion of the image data writing, the operation control unit carries out the communication operation, as described in detail later with reference to FIG. 3.

The operation control unit selects and executes the monitoring operation from when the user-operated unit 102 is operated to when the image data writing operation is completed.

The following is a description of changes in operation states of the recording unit 105 and the power supply control unit 108 when continuous shooting is performed by the camera main unit 100.

Figure 2:
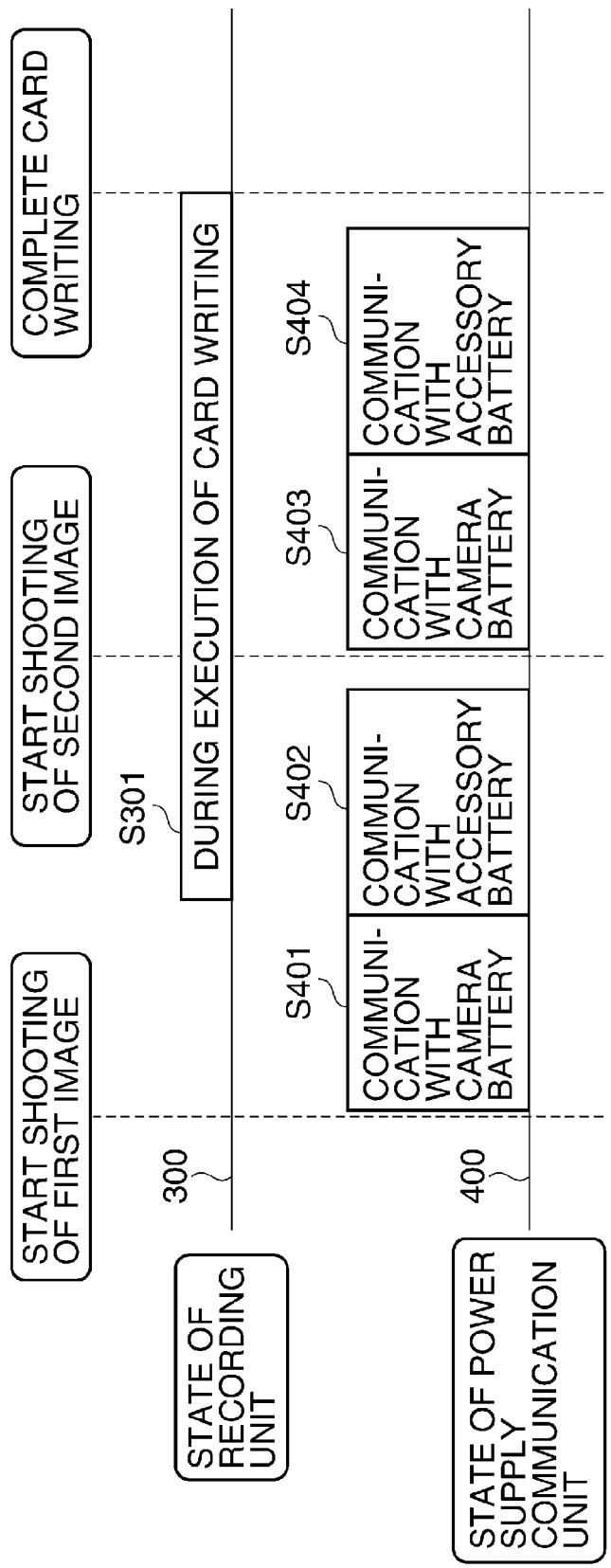
FIG. 2 is a view showing changes in states of a recording unit and a power supply communication unit with elapse of time during when two images are continuously shot in a case where a communication battery is housed in each of a camera power supply housing unit and an accessory power supply housing unit of the digital camera shown in FIG. 1.

FIG. 2 shows changes in states of the recording unit 105 and the power supply communication unit 109 with elapse of time during when two images are continuously shot in a case where the communication battery 203 is housed in each of the camera power supply housing unit 106 and the accessory power supply housing unit 202.

It should be noted that the communication battery 203 is able to always communicate with the power supply communication unit 109 since the battery 203 is capable of generating power without requiring external power supply via an AC power cord, unlike the AC adapter 107.

When requested from the camera control unit 101 to perform the writing of a first image file, the recording unit 105 starts to write the first image file onto a recording medium, e.g., a memory card. Therefore, the operation state 300 of the recording unit 105 changes from a standby state to a state S301 of "during execution of card writing". In the state S301, the recording unit 105 executes the writing of the first image file and then executes the writing of a second image file. Upon completion of the writing of the second image file, the recording unit 105 changes from the state S301 of "during execution of card writing" to a standby state.

At start of shooting of the first image, the operation state 400 of the power supply communication unit 109 changes from a standby state to a state S401 of "communication with camera battery". In the state S401, the power supply communication unit 109 communicates with the communication battery 203 in the camera power supply housing unit 106 to acquire remaining battery capacity information, and then notifies the acquired battery capacity information to the power supply control unit 108.

Next, the power supply communication unit 109 changes from the state S401 to a state S402 of "communication with accessory battery". In the state S402, the communication unit 109 communicates with the communication battery 203 in the accessory power supply housing unit 202 to acquire remaining battery capacity information, and notifies the acquired information to the power supply control unit 108. Then, the communication unit 109 changes from the state S402 to a standby state.

At start of shooting of the second image, the communication unit 109 changes from the standby state to a state S403 of "communication with camera battery". In the state S403, the communication unit 109 again communicates with the communication battery 203 in the camera power supply housing unit 106 to acquire remaining battery capacity information, and notifies the acquired information to the power supply control unit 108.

Next, the power supply communication unit 109 changes from the state S403 to a state S404 of "communication with accessory battery". In the state S404, the communication unit 109 again communicates with the communication battery 203 in the accessory power supply housing unit 202 to acquire remaining battery capacity information, notifies the acquired information to the power supply control unit 108, and then returns to a standby state.

As described above, the state 400 of the power supply communication unit 109 is not affected by a change in the state 300 of the recording unit 105.

FIG. 3 is a view showing changes in states of the recording unit 105 and the power supply communication unit 109 with elapse of time during when two images are continuously photographed in a case where the AC adapter 107 is housed in the camera power supply housing unit 106 and the communication battery 203 is housed in the accessory power supply housing unit 202.

With this power supply arrangement, if the power supply communication unit 109 communicates with the accessory battery during the execution of card writing as with the states S402 and S404 in FIG. 3, the communication unit 109 is unable to detect, if any, an occurrence of abnormality of the AC adapter 107. To obviate this, the operation state 500 of the communication unit 109 is changed as described below.

From when the shooting operation is started to when the card writing is completed, the power supply communication unit 109 is set at a state S501 to monitor the operation state of the AC adapter 107. In the state S501, the communication unit 109 monitors the voltage level on the communication line 112 through which the communication unit 109 is connected with the AC adapter 107 housed in the camera power supply housing unit 106. When detecting that the voltage level on the communication line 112 is at a low level for a predetermined time period, the communication unit 109 determines that the AC power cord 111 of the AC adapter 107 is unplugged, and then notifies an occurrence of power supply abnormality to the power supply control unit 108.

When the card writing is completed without an occurrence of power supply abnormality, the power supply communication unit 109 changes from the state S501 to a state S502 of "communication with accessory battery". In the state S502, the communication unit 109 communicates with the communication battery 203 in the accessory power supply housing unit 202 to acquire remaining battery capacity information from the communication battery 203, notifies the acquired information to the power supply control unit 108, and then returns to a standby state.

By changing the operation state 500 of the power supply communication unit 109 as described above, the camera main unit 100 is able to immediately carry out an urgent termination process in proper timing without fail based on the power supply abnormality notification (AC power cord unplugging notification) from the communication unit 109, if the AC power cord 111 of the AC adapter 107 is unplugged during the writing of image data onto the memory card (recording medium), making it possible to prevent data in the memory card from being damaged.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-234857, filed Sep. 12, 2008, which is hereby incorporated by reference herein in its entirety.

What is claimed is:

1. An image pickup apparatus having an image pickup apparatus main unit and an accessory unit mounted to the image pickup apparatus main unit, comprising:
   a write control unit adapted to write image data onto a recording medium; and
   an operation control unit adapted to select and execute either a monitoring operation to monitor a state of a power supply for the image pickup apparatus main unit or a communication operation to communicate with a power supply for the accessory unit,
   wherein said operation control unit is adapted to select and execute the monitoring operation while said write control unit is performing an image data writing operation, and to select and execute the communication operation after completion of the image data writing operation.

2. The image pickup apparatus according to claim 1, wherein the power supply for the image pickup apparatus main unit is configured to be externally supplied with electric power.

3. The image pickup apparatus according to claim 1, including:
   an operation unit adapted to be operated to start a shooting operation,
   wherein said operation control unit is adapted to select and execute the monitoring operation from when said operation unit is operated to when the image data writing operation is completed.

4. A control method for an image pickup apparatus having an image pickup apparatus main unit and an accessory unit mounted to the image pickup apparatus main unit, comprising:
   a write control step of writing image data onto a recording medium by a write control unit; and
   an operation control step of selecting and executing either a monitoring operation to monitor a state of a power supply for the image pickup apparatus main unit or a communication operation to communicate with a power supply for the accessory unit,
   wherein in said operation control step, the monitoring operation is selected and executed while the write control unit is performing an image data writing operation, and the communication operation is selected and executed after completion of the image data writing operation.

5. An image pickup apparatus having an image pickup apparatus main unit and an accessory unit mounted to the image pickup apparatus main unit, comprising:
   a write control unit adapted to write image data onto a recording medium; and
   an operation control unit adapted to select and execute either a monitoring operation to monitor a state of a power supply for the image pickup apparatus main unit or a communication operation to communicate with a power supply for the accessory unit,
   wherein in case when the power supply for the image pickup apparatus main unit is externally supplied with electric power, said operation control unit is adapted to select and execute the monitoring operation while said write control unit is performing an image data writing operation,
   wherein in case when the power supply for the image pickup apparatus main unit is a battery accommodated in the image pickup apparatus main unit, said operation control unit is adapted to select and execute both of the monitoring operation and the communication operation while said write control unit is performing an image data writing operation.

6. The image pickup apparatus according to claim 5, including:
   an operation unit adapted to be operated to start a shooting operation,
   wherein in case when the power supply for the image pickup apparatus main unit is externally supplied with electric power, said operation control unit is adapted to select and execute the monitoring operation from when said operation unit is operated to when the image data writing operation is completed.

7. A control method for an image pickup apparatus having an image pickup apparatus main unit and an accessory unit mounted to the image pickup apparatus main unit, comprising:
   a write control step of writing image data onto a recording medium by a write control unit; and
   an operation control step of selecting and executing either a monitoring operation to monitor a state of a power supply for the image pickup apparatus main unit or a communication operation to communicate with a power supply for the accessory unit,
   wherein in case when the power supply for the image pickup apparatus main unit is externally supplied with electric power, in said operation control step, the monitoring operation is selected and executed while the write control unit is performing an image data writing operation,
   wherein in case when the power supply for the image pickup apparatus main unit is a battery accommodated in the image pickup apparatus main unit, in said operation control step, both of the monitoring operation and the communication operation are selected and executed while the write control unit is performing an image data writing operation.

* * * * *